United States Patent
Kwak et al.

(10) Patent No.: US 11,477,658 B2
(45) Date of Patent: Oct. 18, 2022

(54) METHOD OF PERFORMING NETWORK LISTENING FOR RU IN CLOUD-RADIO ACCESS NETWORK STRUCTURE BASE STATION

(71) Applicant: INNOWIRELESS CO., LTD., Seongnam-si (KR)

(72) Inventors: Young Su Kwak, Suwon-si (KR); Min Ho Yu, Pohang-si (KR); Seung Hwan Ji, Seongnam-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 0 days.

(21) Appl. No.: 17/314,686

(22) Filed: May 7, 2021

(65) Prior Publication Data
US 2022/0201494 A1    Jun. 23, 2022

(30) Foreign Application Priority Data
Dec. 23, 2020   (KR) ........................ 10-2020-0182608

(51) Int. Cl.
*H04W 16/10* (2009.01)
*H04W 16/18* (2009.01)
(Continued)

(52) U.S. Cl.
CPC ........... *H04W 16/10* (2013.01); *H04W 16/18* (2013.01); *H04W 24/02* (2013.01); *H04W 24/10* (2013.01); *H04W 48/16* (2013.01)

(58) Field of Classification Search
CPC ..... H04W 16/10; H04W 16/18; H04W 24/02; H04W 24/10; H04W 48/16
See application file for complete search history.

(56) References Cited

FOREIGN PATENT DOCUMENTS

| KR | 101893053 B1 | 8/2018 |
|---|---|---|
| KR | 101976746 B1 | 5/2019 |

(Continued)

*Primary Examiner* — Julio R Perez
(74) *Attorney, Agent, or Firm* — Kaplan Breyer Schwarz, LLP

(57) ABSTRACT

Provided is a method of performing network listening (NL) for a radio unit (RU) in a Cloud-Radio Access Network (C-RAN) structure base station in which a certain RU distinguishes and automatically detects signals of neighboring RUs through NL in a C-RAN structure base station to thereby enable optimization and automation of configuration setting of multiple cells and multiple RUs. The method of performing NL for a RU in a base station having a structure of a C-RAN, performed between a C-RAN base station body and a RU in the C-RAN supporting multiple cells and multiple RUs, includes the steps of: (a) searching for, by the C-RAN base station body, RU configuration (a cell-RU combination) information constructed therein to instruct an RU that is to perform NL to perform the NL while instructing a RU using the same physical cell identifier (PCI) as the RU that is to perform the NL to turn off a radio frequency (RF) transmit (Tx) output thereof during performance of the NL of the RU that is to perform NL; (b) performing, by the RU instructed to perform the NL, the NL with a RF transmit (Tx) output thereof turned off; (c) turning on, by the RU instructed to perform the NL, the RF transmit (Tx) output thereof after completion of the performance of the NL while reporting a result of the performance of the NL and completion of the NL to the C-RAN base station body; and (d) instructing, by the C-RAN base station body, the RU using the same PCI to turn on the RF transmit (Tx) output thereof.

8 Claims, 6 Drawing Sheets

(51) Int. Cl.
*H04W 48/16* (2009.01)
*H04W 24/10* (2009.01)
*H04W 24/02* (2009.01)

(56) References Cited

FOREIGN PATENT DOCUMENTS

| | | | |
|---|---|---|---|
| KR | 102063570 | B1 | 1/2020 |
| KR | 102083273 | B1 | 2/2020 |

[Fig. 6]
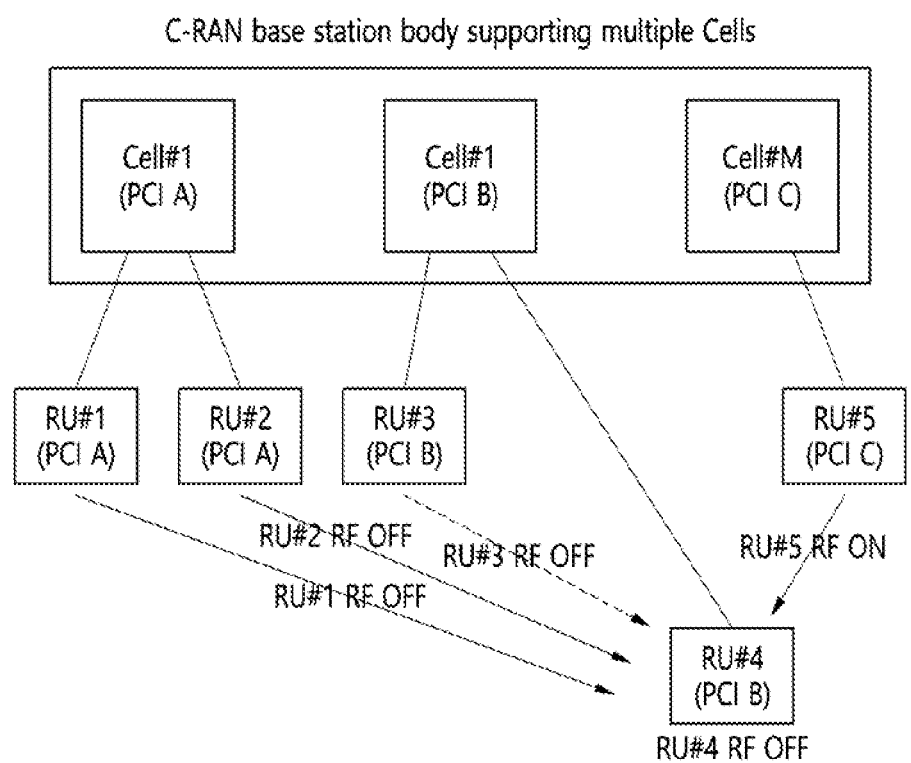

METHOD OF PERFORMING NETWORK LISTENING FOR RU IN CLOUD-RADIO ACCESS NETWORK STRUCTURE BASE STATION

CROSS-REFERENCE TO RELATED APPLICATION

This application claims priority to and the benefit of Korean Patent Application No. 2020-0182608, filed on Dec. 23, 2020, the disclosure of which is incorporated herein by reference in its entirety.

BACKGROUND

1. Field of the Invention

The present invention relates to a method of performing network listening (NL) for multiple radio units (RUs) in a Cloud-Radio Access Network (C-RAN) structure base station, and more specifically, to a method of performing network listening (NL) for a RU in a C-RAN structure base station in which a certain RU distinguishes and automatically detects signals of neighboring other RUs through NL in a C-RAN structure base station to thereby enable optimization and automation of configuration setting of multiple cells and multiple RUs.

2. Discussion of Related Art

As is well known, Cloud-Radio Access Network (C-RAN) is a radio access network that separates a digital unit (DU) and a radio unit (RU) (i.e., a radio frequency (RF) unit) of a base station from each other such that a plurality of DUs are gathered and processed at the center and RUs are distributed over service areas.

In such a C-RAN structure base station, the RUs may be deployed and operated, for example, in different places or floors in a building, and in this case, each cell of the C-RAN may be formed to be assigned a plurality of RUs and provide services.

FIG. 1 is a view for describing a limitation that may occur in the conventional C-RAN structure base station having a configuration of multiple cells and multiple RUs. Referring to FIG. 1, when multiple cells cell #1 to cell #M are included in the C-RAN structure base station, interference may occur between RU groups, each of which is connected to a corresponding one of the multiple cells, or handover may occur when a terminal moves. Accordingly, in order to optimize the coverage and performance of the C-RAN structure base station, there is a need for a task of minimizing the interference between the RU groups and the handover by changing the number of cells inside the C-RAN structure base station and RUs allocated to each cell, and adjusting the output of a specific RU, and as preliminary work for this, there is a need for a process of detecting the radio wave environment around RUs.

Meanwhile, in order to detect the radio wave environment around RUs of the C-RAN structure base station, a RU needs to measure the signal strength and quality of neighboring cells using a specific physical cell identifier (PCI) using a network listening (NL) function, but when a neighboring RU is allocated to the same cell as the RU performing NL, the RU itself may not distinguish the output signal thereof from the output signal of the neighboring RU, thereby failing to identity the neighboring RU through NL.

As described above, the C-RAN structure base station supporting multiple cells and multiple RUs has a difficulty in automatic setting for maximizing service quality in a region controlled by the RU and base station efficiency according to mapping of each cell and RU and in automatic optimization in the operation process.

RELATED ART DOCUMENTS

PATENT DOCUMENT 1: Korean Registered Patent No. 10-2083273, titled "An apparatus and method for dynamically configuring Cloud-RAN"

PATENT DOCUMENT 2: Korean Registered Patent No. 10-1976746, titled "A method and apparatus for synchronization acquisition between small cells"

PATENT DOCUMENT 3: Korean Registered Patent No. 10-1893053, titled "A method for automatically detecting change of small cell installation place"

PATENT DOCUMENT 4: Korean Registered Patent No. 10-2063570, titled "A method and apparatus for small cell synchronization based on NL"

SUMMARY OF THE INVENTION

The present invention is directed to providing a method of performing network listening (NL) for a radio unit (RU) in a Cloud-Radio Access Network (C-RAN) structure base station that is capable of enabling optimization and automation of configuration setting of multiple cells and multiple RUs by allowing a certain RU in a C-RAN structure base station using multiple RUs to distinguish and automatically detect signals of neighboring RUs through NL.

The technical objectives of the present invention are not limited to the above, and other objectives may become apparent to those of ordinary skill in the art based on the following description.

According to the first aspect of the present invention, there is provided a method of performing network listening (NL) for a radio unit (RU) in a base station having a structure of a Cloud-Radio Access Network (C-RAN), the method performed between a C-RAN base station body and a RU in the C-RAN supporting multiple cells and multiple RUs, and including the steps of: (a) searching for, by the C-RAN base station body. RU configuration (a cell-RU combination) information constructed therein to instruct a RU that is to perform NL to perform the NL while instructing a RU using the same physical cell identifier (PCI) as the RU that is to perform the NL to turn off a radio frequency (RF) transmit (Tx) output thereof during performance of the NL of the RU that is to perform NL; (b) performing, by the RU instructed to perform the NL, the NL with a RF transmit (Tx) output thereof turned off; (c) turning on, by the RU instructed to perform the NL the RF transmit (Tx) output thereof after completion of the performance of the NL while reporting a result of the performance of the NL and completion of the NL to the C-RAN base station body; and (d) instructing, by the C-RAN base station body, the RU using the same PCI to turn on the RF transmit (Tx) output thereof.

The C-RAN base station body may determine an NL period and an NIL performance order and instruct a corresponding RU to perform NL while controlling all RUs to take turns performing NL in the order.

The RU instructed to perform the NL in the step (b) may start the NL after a period of slack time has elapsed without performing the NL immediately after being instructed to perform the NL.

The RU instructed to turn on the RF transmit (Tx) output thereof by the C-RAN base station body in the step (d) may turn on the RF transmit (Tx) output thereof immediately after being instructed to turn on the RF transmit (Tx) output thereof.

According to the second aspect of the present invention, there is provided a method of performing network listening (NL) for a radio unit (RU) in a base station having a structure of a Cloud-Radio Access Network (C-RAN), the method performed between a C-RAN base station body and a RU in the C-RAN supporting multiple cells and multiple RUs, and including the steps of: (i) when the C-RAN base station body determines to perform NL for a specific RU, searching for, by the C-RAN base station body, RU configuration (a cell-RU combination) information constructed therein and instructing all RUs except for the specific RU to turn off radio frequency (RF) transmit (Tx) outputs thereof during performance of NL; (j) performing, by a RU instructed to perform NL, the NL with a RF transmit (Tx) output thereof turned off; and (k) turning on, by the RU instructed to perform the NL, the RF transmit (Tx) output thereof after completion of the performance of the NL while reporting a result of the performance of the NL and completion of the NL to the C-RAN base station body.

The RU instructed to perform the NL in the step (i) may start the NL after a period of slack time has elapsed without performing the NL immediately after being instructed to perform the NL.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 is a view for describing a process of performing NL while turning off outputs of other RUs except for a specific RU in the method of performing NL for the RU in the C-RAN structure base station according to the present invention.

DETAILED DESCRIPTION OF EXEMPLARY EMBODIMENTS

Hereinafter, exemplary embodiments of a method of performing network listening (NL) for a radio unit (RU) in a Cloud-Radio Access Network (C-RAN) structure base station will be described in detail with reference to the accompanying drawings.

Figure 1:
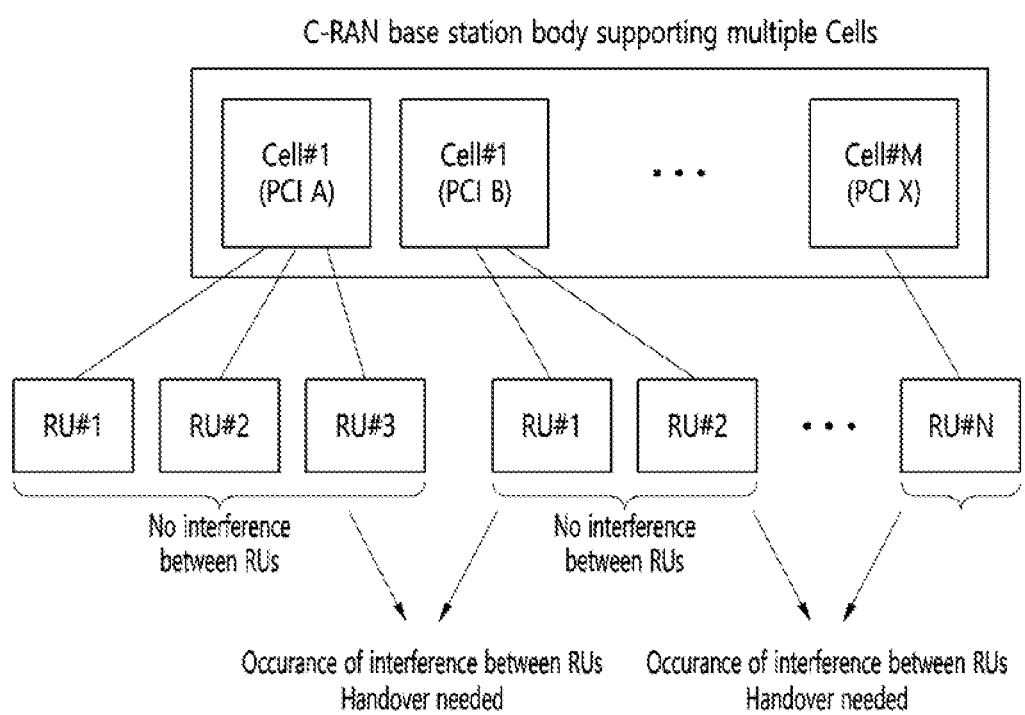
FIG. 1 is a view for describing a limitation that may occur in the conventional Cloud-Radio Access Network (C-RAN) structure base station having a configuration of multiple cells and multiple RUs.
Figure 2:
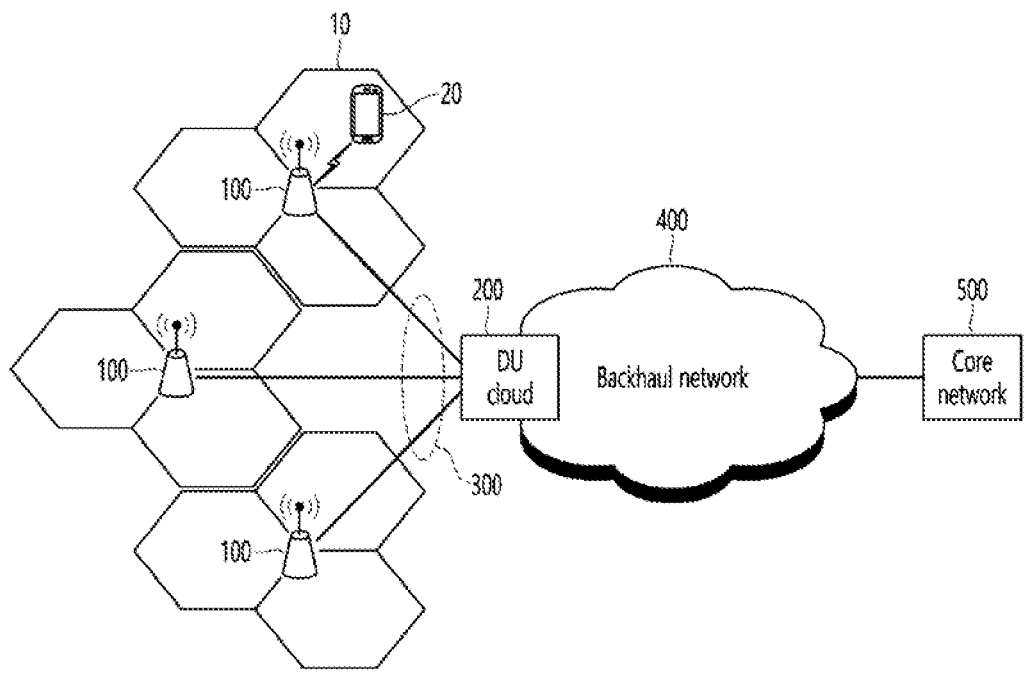
FIG. 2 is a view for describing a general C-RAN structure.

FIG. 2 is a view for describing a general C-RAN structure. Referring to FIG. 2, a general C-RAN includes RUs 100, a digital unit (DU) cloud 200, and a fronthaul network 300.

In the above configuration, the RU 100 is a device installed at a cell site, for example, a different place or floor in a building, and performing wireless communication with a mobile communication terminal 20 located within the cell site, and basically, performs wireless signal transmission and reception with the mobile communication terminal 20, radio frequency (RF) signal processing, such as filtering, amplification, analog/digital conversion, and digital/analog conversion of transmitted and received wireless signals, and some physical layer functions. As such, the multiple RUs 100 installed within the cell site are connected to the DU cloud 200 located at a remote site through the fronthaul network 300 to serve as a base station.

The DU cloud 200 is connected to the multiple RUs 100 through the fronthaul network 300 and connected to a core network 500 of a mobile communication system through a backhaul network 400 to process data traffic between a mobile communication terminal 20 connected to the RU 100 and the core network 500.

The core network 500 is a configuration for performing signaling control and data traffic routing in the mobile communication system, for example, an evolved packet core (EPC) defined in long-term evolution (LTE) or a fifth-generation technology standard (5G) core. The fronthaul network 300 is a delivery network for delivering data between the multiple RUs 100 and the DU cloud 200 and may be built in various structures, such as a star, a tree, a chain or a ring based on optical fiber or microwaves. As a communication interface, a common public radio interface (CPRI), an open baseband remote radio-head interface (OB-SAI), etc. are used.

As such, the C-RAN structure base station collects DUs in one place and operates the DUs, and thus has reduced rental costs and power costs in network operation, and easy maintenance.

Figure 3:
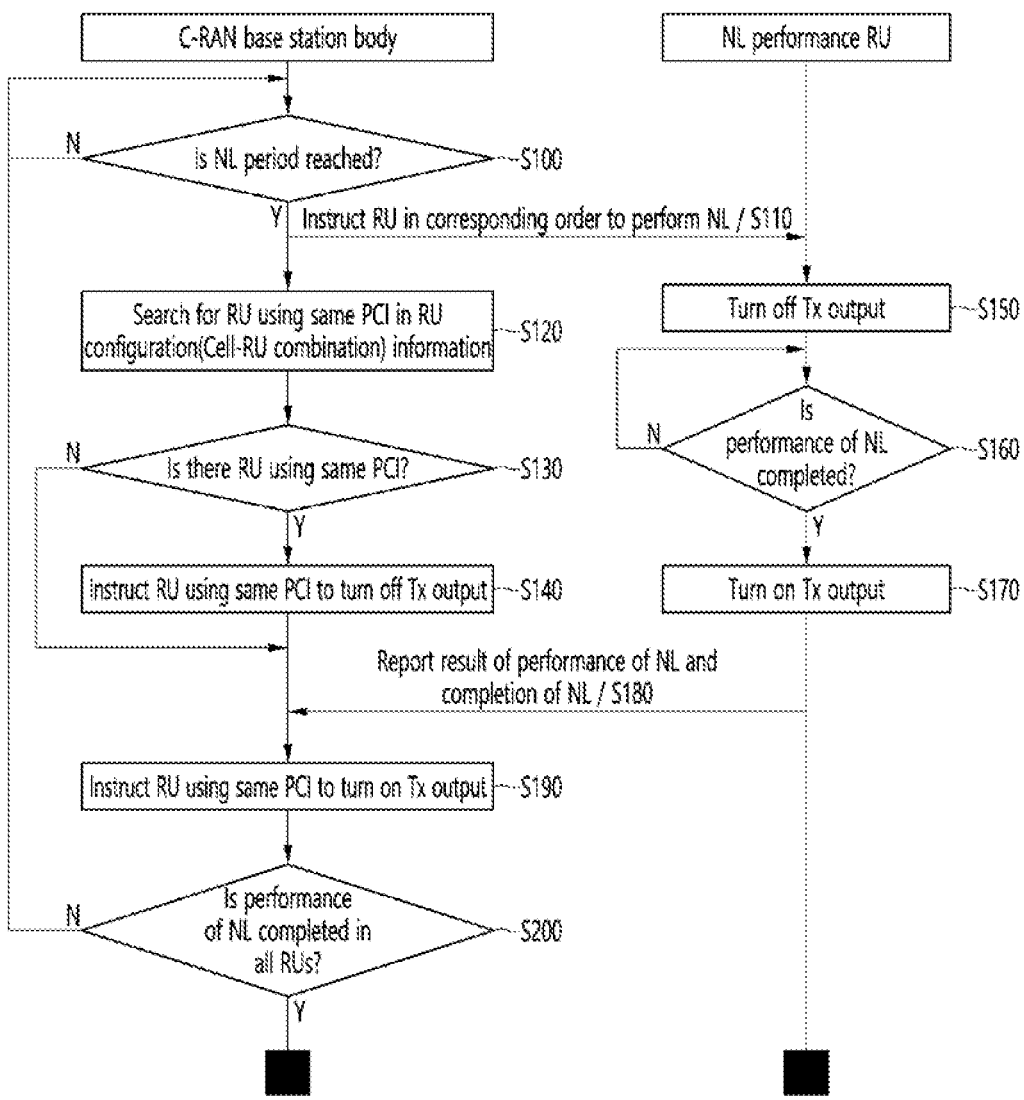
FIG. 3 is a sequence chart for describing a method of performing network listening (NL) for a radio unit (RU) in a C-RAN structure base station according to the present invention.

FIG. 3 is a sequence chart for describing the method of performing NL for an RU in a C-RAN structure base station according to the present invention. First, the C-RAN base station body, that is, the cloud DU, determines whether a predetermined NL period is reached (S100). Here, during performance of NL, a RU may not allocate downlink data to a user due to having a RF transmit (Tx) part thereof being turned off. Accordingly, all RUs may be provided to perform NL for a predetermined period of time, for example, one hour or one day, by turns such that the impact of turn-off of the RF transmit (Tx) output may be minimized as a whole. The period or order in which NL is performed may be determined by the C-RAN base station body and transmitted to a corresponding RU.

When it is determined in operation S100 that the period for NL performance is reached, the C-RAN base station body instructs a RU in the corresponding order to perform NL (S110), and searches for a RU using the same physical cell identifier (PCI) as the RU that is to perform the NL in RU configuration (a cell-RU combination) information constructed in the C-RAN base station body (S120). Then, the C-RAN base station body determines whether there is a RU using the same PCI as the RU that is to perform the NL (S130), and when it is determined there is a RU using the same PCI, instructs the RU using the same PCI to turn off the RF transmit (Tx) output thereof during performance of the NL (S140).

Meanwhile, the RU instructed to perform the NL turns off the RF transmit (Tx) output thereof (SIS) and performs the NL.

Figure 4:
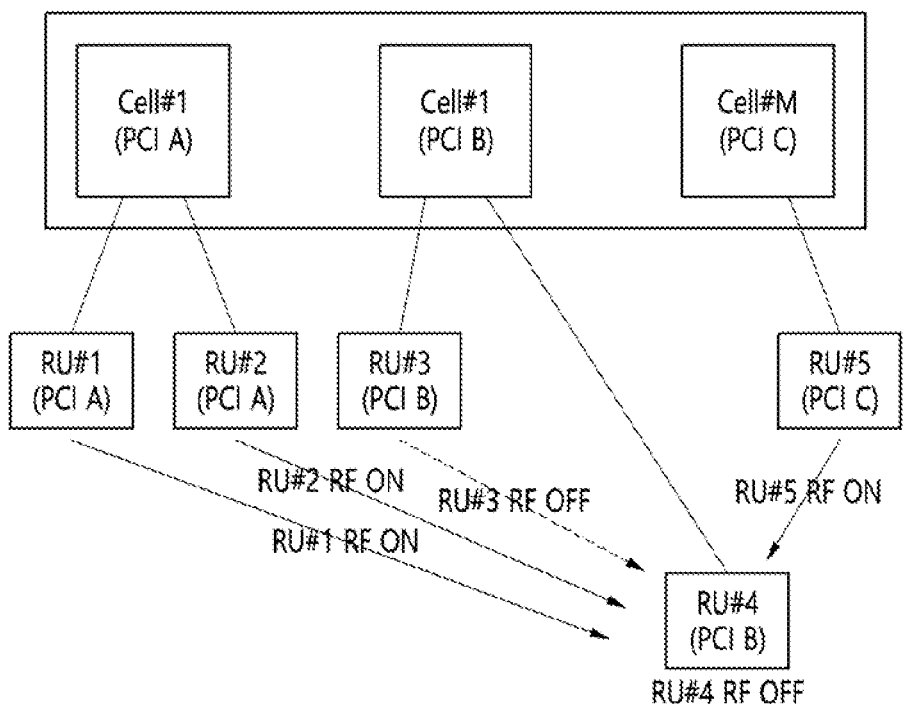
FIG. 4 is a view for describing a process in which a certain RU performs NL on neighboring RUs shown in FIG. 3.

FIG. 4 is a view for describing a process in which a certain RU performs NL on neighboring RUs shown in FIG. 3. Referring to FIG. 4, since a fourth RU RU #4 that is to perform current NL belongs to a firth cellCell #1 and has a PCI of 'PCI B' while a third RU RU #3 also has a PCI of 'PC B', the C-RAN base station body confirms that the third RU RU #3 and the fourth RU RU #4 have the same PCI by searching a neighbor relation table (NRT), and instructs the third RU RU #3 to turn off the RF transmit (Tx) output thereof during the performance of the NL. The forth RU RU #4 instructed to perform the NL also turns off the RF transmit (Tx) output thereof during the performance of the NL.

Meanwhile, a first RU RU #1 and a second RU RU #2 belong to the first cell Cell #1 but have a PCI of 'PCI A', and a fifth RU RU #5 belongs to another cell, that is, a $m^{th}$ cell Cell #M and has a PCI of 'PCI C', so that the first RU RU #1, the second RU RU #2, and the fifth RU RU #5 keep the RF transmit (Tx) outputs thereof turned on, and the fourth RU RU #4 performs NL on such RUs keeping the RF transmit (Tx) outputs thereof turned on.

Figure 5:
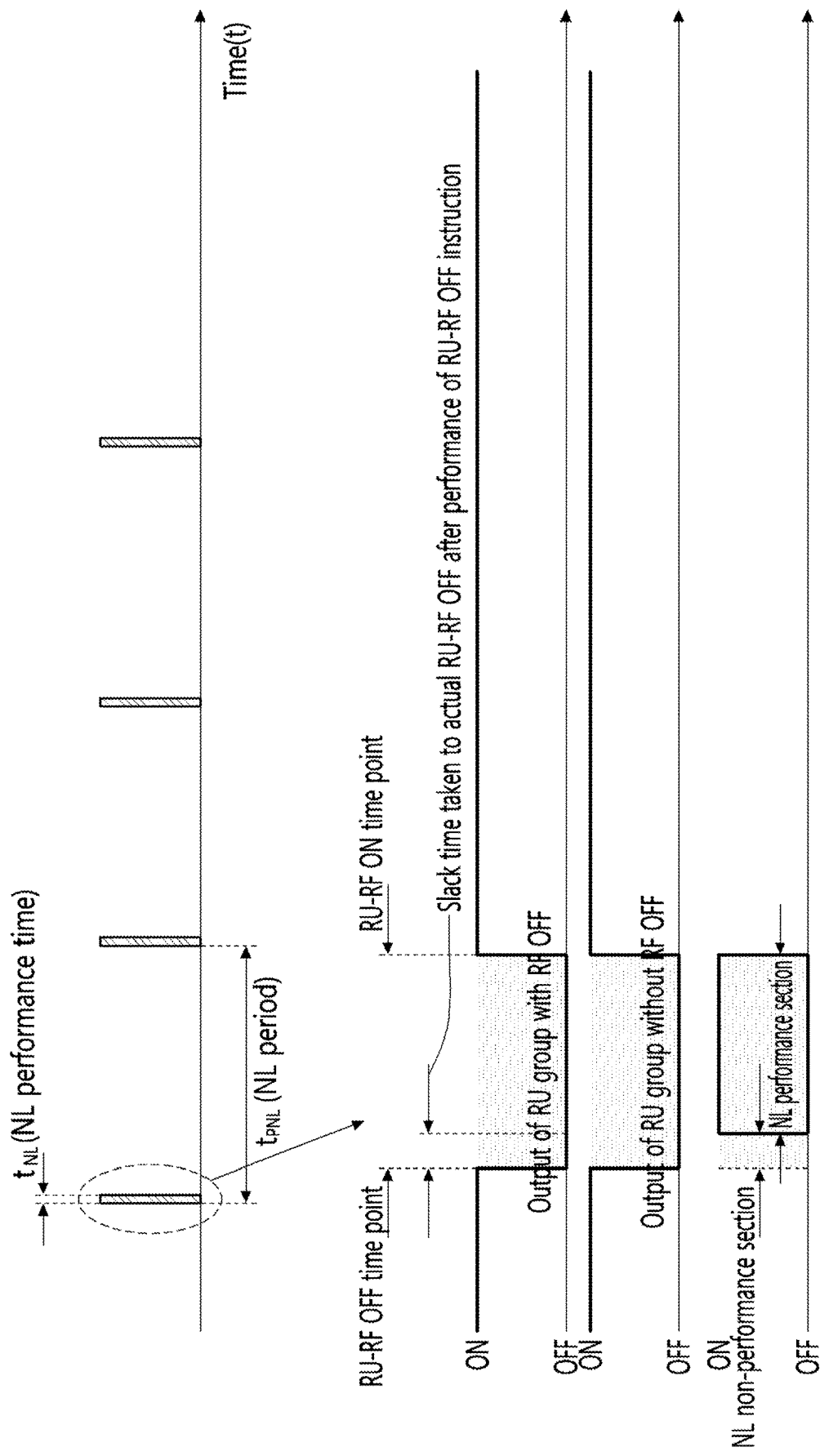
FIG. 5 is a timing chart showing an operation timing of RUs during NL performance in the method of performing NL for the RU in the C-RAN structure base station according to the present invention.

FIG. 5 is a timing chart showing an operation timing of RUs during NL performance in the method of performing NL for the RU in the C-RAN structure base station according to the present invention. Referring to FIG. 5, even though RUs instructed to turn off the RF transmit (Tx) outputs thereof immediately turn off the RF transmit (Tx) outputs thereof, it takes a certain period of slack time for the RF transmit (Tx) outputs to be turned off in practice. Accordingly, the RU instructed to perform NL starts the NL only after the slack time has passed rather than immediately performing the NL. On the other hand, the on-time of the RF transmit (Tx) outputs of the RUs is performed immediately after receipt of an instruction from the C-RAN base station body.

Referring again to FIG. 4, the RU instructed to perform the NL checks whether the performance of the NL is completed (S160), and when the performance of the NL is completed, immediately turns on the RF transmit (Tx) output thereof (S170) while reporting a result of the performance of the NL and completion of the NL to the C-RAN base station body (S180).

Next, the C-RAN base station body receiving the report immediately performs an operation of instructing the RU using the same PCI to turn on the RF transmit (Tx) output thereof (S190) and proceeds to operation S200 of determining whether the performance of the NL has been completed in all RUs. When it is determined in operation S200 that the performance of the NL of all RUs is not completed, the C-RAN base station body returns to operation S100, and as soon as the next period for NL performance is reached, instructs the next RU to perform NL.

Meanwhile, while all of the RUs are taking turns in performing NL as described above, the influence of a specific RU on neighboring RUs needs to be checked. FIG. 6 is a view for describing a process of performing NL while turning off outputs of other RUs except for a specific RU in the method of performing NL for a RU in the C-RAN structure base station according to the present invention.

Referring to FIG. 6, in a case in which the C-RAN base station body determines to perform NL for one specific RU, for example, only the fifth RU RU #S, the C-RAN base station body instructs the remaining RUs to perform NL for the fifth RU RU #5 whose RF transmit (Tx) output is turned on while the RF transmit (Tx) outputs of the remaining RUs are turned off during performance of the NL. In this case, because the RF transmit (Tx) outputs of all of the RUs except for the fifth RU RU #5, which is the NL target, are turned off, the resulting impact is very large. Accordingly, NL may be performed one time or unexpectedly only when absolutely required.

Meanwhile, each RU having completed NL reports the result of the performance of the NL to the C-RAN base station body and immediately turns on the RF transmit (Tx) output thereof.

As is apparent from the above, the method of performing NL for an RU in a C-RAN structure base station can enable optimization and automation of configuration setting of multiple cells and multiple RUs by allowing a certain RU in a C-RAN structure base station using multiple RUs to distinguish and automatically detect signals of neighboring RUs through NL.

Although the present invention has been described in detail above with reference to the exemplary embodiments, it should be understood that the disclosed embodiments are not limiting but illustrative in all aspects and various modifications and alterations may be made without departing from the technical spirit or essential features of the present invention. Therefore, the scope of the present invention is defined not by the above description but by the following claims.

What is claimed is:

1. A method of performing network listening (NL) for a radio unit (RU) in a base station having a structure of a Cloud-Radio Access Network (C-RAN), which is performed between a C-RAN base station body and a RU in the C-RAN supporting multiple cells and multiple RUs, the method comprising the steps of:
   (a) searching for, by the C-RAN base station body, RU configuration (a cell-RU combination) information constructed therein to instruct a RU that is to perform NL to perform the NL while instructing a RU using the same physical cell identifier (PCI) as the RU that is to perform the NL to turn off a radio frequency (RF) transmit (Tx) output thereof during performance of the NlL of the RU that is to perform NL;
   (b) performing, by the RU instructed to perform the NL, the NL with a RF transmit (Tx) output thereof turned off;
   (c) turning on, by the RU instructed to perform the NL, the RF transmit (Tx) output thereof after completion of the performance of the NL while reporting a result of the performance of the NL and completion of the NL to the C-RAN base station body; and
   (d) instructing, by the C-RAN base station body, the RU using the same PCI to turn on the RF transmit (Tx) output thereof.

2. The method of claim 1, wherein the C-RAN base station body determines an NL period and an NL performance order and instructs a corresponding RU to perform NL while controlling all RUs to take turns performing NL in the order.

3. The method of claim 2, wherein the RU instructed to perform the NL in the step (b) starts the NL after a period of slack time has elapsed without performing the NL immediately after being instructed to perform the NL.

4. The method of claim 3, wherein the RU instructed to turn on the RF transmit (Tx) output thereof by the C-RAN base station body in the step (d) turns on the RF transmit (Tx) output thereof immediately after being instructed to turn on the RF transmit (Tx) output thereof.

5. The method of claim 1, wherein the RU instructed to turn on the RF transmit (Tx) output thereof by the C-RAN base station body in the step (d) turns on the RF transmit (Tx) output thereof immediately after being instructed to turn on the RF transmit (Tx) output thereof.

6. The method of claim 2, wherein the RU instructed to turn on the RF transmit (Tx) output thereof by the C-RAN base station body in the step (d) turns on the RF transmit (Tx) output thereof immediately after being instructed to turn on the RF transmit (Tx) output thereof.

7. A method of performing network listening (NL) for a radio unit (RU) in a base station having a structure of a Cloud-Radio Access Network (C-RAN), which is performed between a C-RAN base station body and a RU in the C-RAN supporting multiple cells and multiple RUs, the method comprising the steps of:

(i) when the C-RAN base station body determines to perform NL for a specific RU, searching for, by the C-RAN base station body, RU configuration (a cell-RU combination) information constructed therein and instructing all RUs except for the specific RU to turn off radio frequency (RF) transmit (Tx) outputs thereof during performance of NL;

(j) performing, by a RU instructed to perform NL, the NL with a RF transmit (Tx) output thereof turned off; and (k) turning on, by the RU instructed to perform the NL, the RF transmit (Tx) output thereof after completion of the performance of the NL while reporting a result of the performance of the NL and completion of the NL to the C-RAN base station body.

8. The method of claim 7, wherein the RU instructed to perform the NL in the step (i) starts the NL after a period of slack time has elapsed without performing the NL immediately after being instructed to perform the NL.

* * * * *